United States Patent
Ahn et al.

(10) Patent No.: US 11,394,922 B2
(45) Date of Patent: Jul. 19, 2022

(54) TERMINAL AND OPERATING METHOD THEREOF

(71) Applicant: Hyperconnect, Inc., Seoul (KR)

(72) Inventors: Sang Il Ahn, Cheongju-si (KR); Kang San Lee, Seoul (KR)

(73) Assignee: Hyperconnect Inc., Seoul (KR)

( * ) Notice: Subject to any disclaimer, the term of this patent is extended or adjusted under 35 U.S.C. 154(b) by 0 days.

(21) Appl. No.: 17/161,787

(22) Filed: Jan. 29, 2021

(65) Prior Publication Data

US 2021/0243407 A1 Aug. 5, 2021

(30) Foreign Application Priority Data

Jan. 31, 2020 (KR) .................. 10-2020-0012233

(51) Int. Cl.
*H04N 7/14* (2006.01)
*H04M 1/253* (2006.01)

(52) U.S. Cl.
CPC ............ *H04N 7/147* (2013.01); *H04M 1/253* (2013.01); *H04N 7/142* (2013.01); *H04M 2201/50* (2013.01); *H04N 2007/145* (2013.01)

(58) Field of Classification Search
USPC ...................................................... 348/14.01
See application file for complete search history.

(56) References Cited

U.S. PATENT DOCUMENTS

| | | | |
|---|---|---|---|
| 7,564,476 B1 * | 7/2009 | Coughlan | H04N 7/147 348/14.08 |
| 8,441,356 B1 | 5/2013 | Tedesco et al. | |
| 9,792,710 B2 | 10/2017 | Kimura | |
| 10,127,195 B2 | 11/2018 | Bliss et al. | |
| 11,140,356 B2 | 10/2021 | Ahn et al. | |
| 11,184,582 B2 | 11/2021 | Ahn et al. | |
| 11,206,362 B2 | 12/2021 | Ahn | |
| 2003/0126267 A1 | 7/2003 | Gutta et al. | |

(Continued)

FOREIGN PATENT DOCUMENTS

| | | |
|---|---|---|
| EP | 3800879 A1 | 4/2021 |
| JP | 2001205243 A | 7/2001 |

(Continued)

OTHER PUBLICATIONS

Office Action issued from Korean Patent Application No. 10-2020-0012233 dated Nov. 20, 2020.

(Continued)

*Primary Examiner* — Amal S Zenati
(74) *Attorney, Agent, or Firm* — KPPB LLP (57) ABSTRACT

Provided is a terminal. The terminal may include an input and output interface configured to receive a first video capturing a first user, a communication interface configured to transmit the first video or a first sound of the first user to a terminal of a counterpart and receive a second video or second sound, which is obtained by the terminal of the counterpart, through a video call session, a display configured to display the first video and the second video, and a processor configured to detect a specific event during the video call session, determine whether an inappropriate element is included in the first video or the first sound when the specific event is detected, and stop transmitting the first video or the first sound according to a result of the determination.

19 Claims, 8 Drawing Sheets

(56) References Cited

U.S. PATENT DOCUMENTS

| | | |
|---|---|---|
| 2013/0234826 A1 | 9/2013 | Sekiguchi et al. |
| 2015/0220777 A1 | 8/2015 | Kauffmann et al. |
| 2017/0251336 A1* | 8/2017 | Keller .................. H04W 8/183 |
| 2018/0103234 A1* | 4/2018 | Ahn ....................... H04N 7/147 |
| 2018/0309801 A1 | 10/2018 | Rathod |
| 2018/0335908 A1* | 11/2018 | Kim ..................... G06F 3/0485 |
| 2019/0188453 A1 | 6/2019 | Ahn et al. |
| 2019/0342246 A1 | 11/2019 | Theriault et al. |

FOREIGN PATENT DOCUMENTS

| | | |
|---|---|---|
| JP | 2011082694 A | 4/2011 |
| JP | 2011205243 A | 10/2011 |
| JP | 2012054897 A | 3/2012 |
| JP | 2012146209 A | 8/2012 |
| JP | 2013531923 A | 8/2013 |
| JP | 2016122975 A | 7/2016 |
| JP | 2019047357 A | 3/2019 |
| JP | 2020010158 A | 1/2020 |
| JP | 2020500488 A | 1/2020 |
| KR | 10-2011-0019499 A | 2/2011 |
| KR | 10-2018-0116520 A | 10/2018 |
| KR | 101989842 B1 | 6/2019 |
| WO | 2018194243 A1 | 10/2018 |
| WO | 2018221824 A1 | 12/2018 |

OTHER PUBLICATIONS

Extended Search Report for European Application No. 21154208.9, Search completed May 21, 2021, dated Jun. 4, 2021, 9 Pgs.

Freitas et al., "A Multimodal CNN-Based Tool to Censure Inappropriate Video Scenes," Nov. 10, 2019, ArXiv, abs/1911.03974, 7 Pgs.

Sood et al., "Automatic Identification of Personal Insults on Social News Sites," Journal of The American Society for Information Science and Technology, Feb. 1, 2012, vol. 63, No. 2, pp. 270-285.

Xing et al., "SafeVchat: Detecting Obscene Content and Misbehaving Users in Online Video Chat Services," World Wide Web, ACM, Mar. 28, 2011, pp. 685-694.

Office Action for Japanese Patent Application No. 2020-165934 dated Sep. 24, 2021, 12 pages.

Office Action for Japanese Patent Application No. 2021013320 dated Jan. 19, 2022, 6 pgs.

"Talking To Complete Strangers On Holla App! Awkward" (i.e., Vid0), Published Jul. 21, 2018, Available online at https://www.youtube.corn/watch?v=F9ddBJ4yJZA.

* cited by examiner

TERMINAL AND OPERATING METHOD THEREOF

CROSS-REFERENCE TO RELATED APPLICATION

This application claims priority to and the benefit of Korean Patent Application No. 2020-0012233, filed on Jan. 31, 2020 the disclosure of which is incorporated herein by reference in its entirety.

BACKGROUND

1. Field of the Invention

Embodiments of the present invention relate to a terminal, which is capable of preventing a user who is making a video call with a counterpart from being exposed to an inappropriate video provided from the counterpart, and an operating method thereof.

2. Discussion of Related Art

With the development of communication technology and miniaturization of electronic devices, personal terminals are widely distributed to general consumers. In particular, recently, portable personal terminals such as smartphones or smart tablet computers are widely distributed. Most terminals have communication functions. Users may search the Internet or transmit or receive messages with other users using the terminals.

Further, with the development of small camera technology, small microphone technology, small display technology, and small speaker technology, most terminals, such as smartphones, have a camera, a microphone, a display, and a speaker. A user may record a voice or capture a video including a voice using a terminal. The user may check a recorded voice through a speaker included in the terminal or check a captured video through a display.

Further, the user may share the recorded voice or the captured video with another user using a communication function of the terminal. The user may transmit a voice previously recorded or a video previously captured to another user. Further, the user may transmit a voice currently being recorded by the terminal or a video currently being captured to another user in real time.

At the same time, another user may transmit a voice currently being recorded by his or her own terminal or a video currently being captured to the user in real time. The display included in the terminal of the user may simultaneously display the video currently being captured by the terminal of the user and the video currently being captured by the terminal of another user. Further, the user and another user may make a video call with each other using their own terminals.

When a user makes a video call with a counterpart, the user may be exposed to a video including an inappropriate element (e.g., an obscene video) provided from the counterpart. For example, a video including an inappropriate element (e.g., a video of a naked body of the counterpart), which is captured by a terminal of the counterpart, may be transmitted to a terminal of the user through a video call session. The terminal of the user displays the received video and thus the user may be exposed to the video including the inappropriate element (e.g., the obscene video). When the user is exposed to a video that he or she does not want to watch, the user may feel sexual shame or feel unpleasant.

SUMMARY OF THE INVENTION

The present invention is directed to providing a terminal, which is capable of preventing a user who is making a video call with a counterpart from being exposed to a video including an inappropriate element (e.g., an obscene video) provided from the counterpart, and an operating method thereof.

The present invention is also directed to providing a terminal, which is capable of preventing sexual shame or displeasure that a user who is making a video call with a counterpart may feel due to a video provided from the counterpart, and an operating method thereof.

The present invention is also directed to providing a terminal, which is capable of inducing users to make a sound video call, and an operating method thereof.

According to an aspect of the present invention, there is provided an application stored in a computer-readable storage medium. The application may comprise establishing a video call session between a first terminal and a second terminal, transmitting at least one of a first video and a first sound obtained from the first terminal corresponding to a first user to the second terminal, receiving, by the first terminal, at least one of a second video and a second sound obtained from the second terminal corresponding to a second user, detecting, by the first terminal, a specific event during the video call session, determining, by the first terminal, whether an inappropriate element is included in the first video or the first sound in response to the detecting of the specific event, and stopping, by the first terminal, the transmitting of the first video or the first sound of the first user according to a result of the determining.

The specific event comprises an event in which the first terminal is inclined in an arbitrary direction at an angular velocity exceeding a threshold angular velocity.

The determining of, by the first terminal, whether the inappropriate element is included in the first video or the first sound may include determining whether the inappropriate element is included in the first video or the first sound, which is obtained after the specific event is detected, using a classification model trained with a correlation between the video or sound and the inappropriate element.

The specific event may include an event in which a face of the first user disappears at a velocity exceeding a threshold velocity from the first video obtained by the first terminal.

The application may further include, when the first terminal stops the transmitting of the first video or the first sound, displaying an alternative video instead of the first video in the second terminal.

The application may further include monitoring, by the first terminal, whether an inappropriate element is included in a video or sound, which is obtained by the first terminal after the transmitting of the first video or the first sound stops, at a predetermined time interval, and when the inappropriate element is not included in the video or sound as a result of the monitoring, resuming the transmitting of the video or sound obtained by the first terminal.

The specific event may be a first specific event, and the application may further include detecting, by the first terminal, a second specific event after the first terminal stops the transmitting of the first video or the first sound, determining whether an inappropriate element is included in a video or sound, which is obtained by the first terminal, in response to the detecting of the second specific event, and when the inappropriate element is not included in the video or sound, which is obtained by the first terminal after the second specific event is detected, resuming, by the first terminal, the transmitting of the video or sound, which is obtained by the first terminal.

The specific event may include an event in which the first terminal is inclined in an arbitrary direction at an angle exceeding a threshold angle.

The determining of whether the inappropriate element is included may include, before the event is detected, determining whether the inappropriate element is included in the first video or the first sound every first period, and when the specific event is detected, determining whether the inappropriate element is included in the first video or the first sound every second period.

According to another aspect of the present invention, there is provided a terminal including an input and output interface configured to receive at least one of a first video and a first sound, which are related, to a first user, a communication interface configured to transmit the at least one of the first video and the first sound to a terminal of a counterpart and receive a second video or second sound, which is obtained by the terminal of the counterpart, through a video call session, a display configured to display the first video and the second video, and a processor configured to detect a specific event during the video call session, determine whether an inappropriate element is included in the first video or the first sound in response to the specific event, and stop transmitting the first video or the first sound according to a result of the determination.

For example, the processor may detect the specific event in at least one of a case in which the terminal is inclined in an arbitrary direction at an angular velocity exceeding a threshold angular velocity and a case in which the terminal is inclined in an arbitrary direction at an angle exceeding a threshold angle.

For example, the processor may determine whether the inappropriate element is included in the first video or the first sound, which is received after the specific event is detected, using a classification model trained using a correlation between the video or sound and the inappropriate element.

For example, the processor may monitor whether the inappropriate element is included in the video or sound, which is received after the transmitting of the first voice or the first sound stops, at a predetermined time interval, and resume the transmitting of the video or sound when the inappropriate element is not found as a result of the monitoring.

For example, the specific event may be a first specific event, and the processor may detect a second specific event after the transmitting of the first video or the first sound stops, when the second specific event is detected, determine whether the inappropriate element is included in the video and sound which is received after the second specific event is detected, and when the inappropriate element is not included, resume the transmitting of the video or sound.

For example, before the specific event is detected, the processor may determine whether the inappropriate element is included in the first video or the first sound every first period, and when the specific event is detected, the processor may determine whether the inappropriate element is included in the first video or the first sound in response to the detection of the specific event.

For example, when the specific event is detected, the processor may determine whether the inappropriate element is included in the first video or the first sound every second period for a predetermined period of time.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, embodiments of the present invention that can be easily performed by those skilled in the art will be described in detail with reference to the accompanying drawings. However, the embodiments of the present invention may be implemented in several different forms and are not limited to embodiments described below. In addition, parts irrelevant to description are omitted in the drawings in order to clearly explain the present invention. The same or similar reference numerals denote the same or similar components in the drawings.

Objects and effects of the present invention may be naturally understood or may become more apparent from the following description and the objects and effects of the present invention are not limited only by the following description.

Hereinafter, exemplary embodiments of the present invention will be described in detail with reference to the accompanying drawings.

Figure 1:
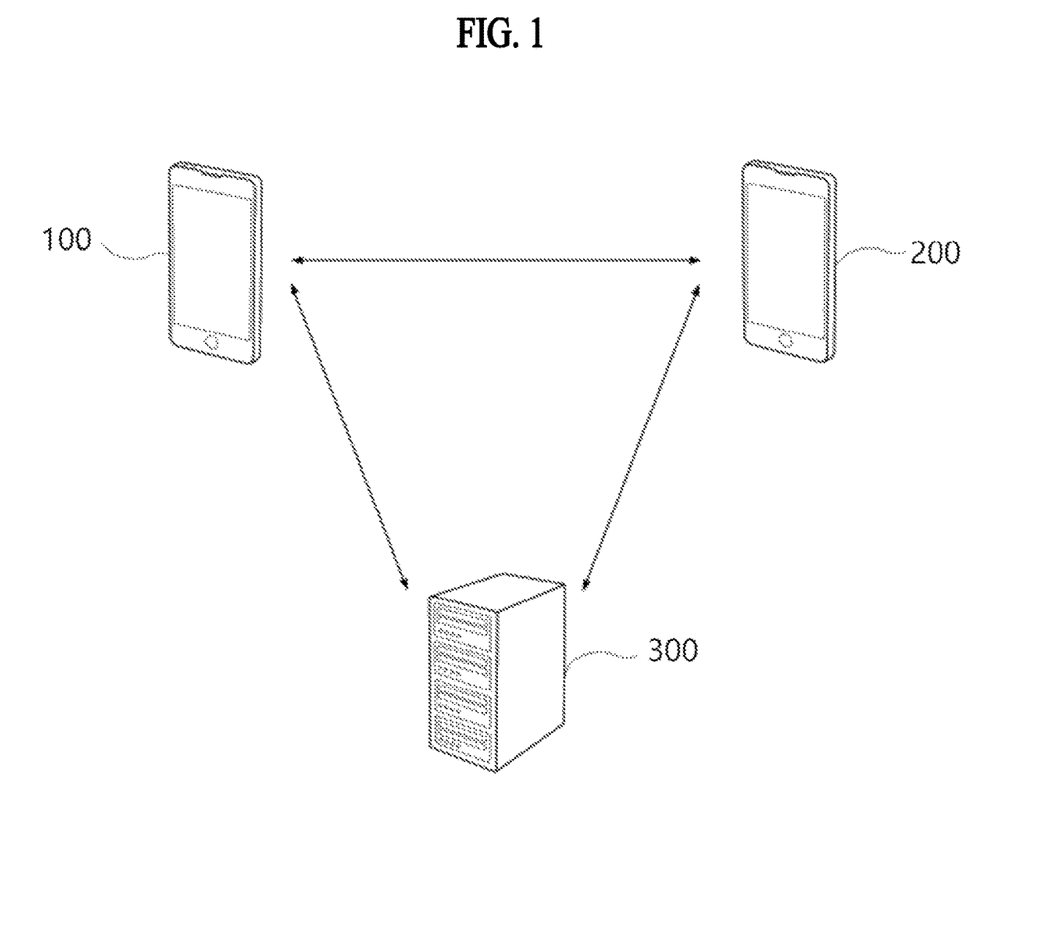
FIG. 1 is a diagram for describing an environment in which a video call service is provided.

FIG. 1 is a diagram for describing an environment in which a video call service is provided.

The video call service refers to a service in which a plurality of users transmit their own videos to counterparts using their own terminals and receive videos from the counterparts to transmit or receive intentions. The users who use the video call service may transmit or receive videos and voices through their own terminals and transmit or receive text data using a chat function. A user who intends to use the video call service may directly designate a counterpart or a server providing the video call service may designate a counterpart in a random manner or a predetermined manner so that the user may use the video call service with the counterpart.

FIG. 1 is a network configuration diagram illustrating an environment in which electronic devices operate according to an embodiment of the present invention. Referring to FIG. 1, an environment in which a plurality of electronic devices 100 and 200 operate may include a server 300 and the plurality of electronic devices 100 and 200. For example, the environment in which the plurality of electronic devices 100 and 200 operate may not include the server 300.

The plurality of electronic devices 100 and 200 may be connected to each other through the server 300. For convenience of description of the present invention, two electronic devices are illustrated in FIG. 1. However, the number of electronic devices is not limited to two. Each of the plurality of electronic devices 100 and 200 may be implemented as one of a desktop computer, a laptop computer, a smartphone, a smart tablet computer, a smart watch, a mobile terminal, a digital camera, a wearable device, and a portable electronic device. The plurality of electronic devices 100 and 200 may execute programs or applications. For example, at least two of the plurality of electronic devices 100 and 200 may be matched by the server 300. The matched electronic devices may make a video call with each other.

Each of the plurality of electronic devices 100 and 200 may be connected to a communication network. Each of the plurality of electronic devices 100 and 200 may be connected to an external device via the communication network. Each of the plurality of electronic devices 100 and 200 may transmit or receive data to or from another device connected thereto.

The communication network connected to each of the plurality of electronic devices 100 and 200 may include a wired communication network, a wireless communication network, or a complex communication network. The communication network may include a mobile communication network using third-generation (3G) communication, Long-Term Evolution (LTE) communication, or LTE Advance (LTE-A) communication, or the like.

The communication network may include a wired or wireless communication network using Wi-Fi, Universal Mobile Telecommunications System (UMTS)/General Packet Radio Service (GPRS), Ethernet, or the like. The communication network may include a short-range communication network using magnetic secure transmission (MST), radio frequency identification (RFID), near field communication (NFC), Zigbee, Z-Wave, Bluetooth, Bluetooth Low Energy (BLE), infrared (IR) communication, or the like. The communication network may include a local area network (LAN), a metropolitan area network (MAN), a wide area network (WAN), or the like.

A first electronic device 100 and a second electronic device 200 connected to each other may transmit or receive messages, files, sound (e.g., voice) data, images, videos, or the like to or from each other. The second electronic device 200 may establish a voice call session or a video call session with the first electronic device 100. The video call session may be established using, for example, a Transmission Control Protocol (TCP), a User Datagram Protocol (UDP), Web Real-Time Communication (WebRTC), or the like. A user of the first electronic device 100 and a user of the second electronic device 200 may make a voice call or a video call with each other.

The video call session may be directly established between the first electronic device 100 and the second electronic device 200. According to another embodiment, the video call session may be established between the first electronic device 100 and the second electronic device 200 via one or more other devices. For example, the video call session may include a session established between the first electronic device 100 and the server 300 and a session established between the server 300 and the second electronic device 200.

The server 300 may connect the plurality of electronic devices 100 and 200 to communicate with each other. The server 300 may receive a match request from each of the plurality of electronic devices 100 and 200. In response to the match request, the server 300 may match the plurality of electronic devices 100 and 200.

Hereinafter, for convenience of description of the present invention, the electronic device and the terminal may be used in the same sense. In addition, a method of communicating the plurality of electronic devices 100 and 200 with the server 300 will be described with reference to FIGS. 2 to 8.

Figure 2:
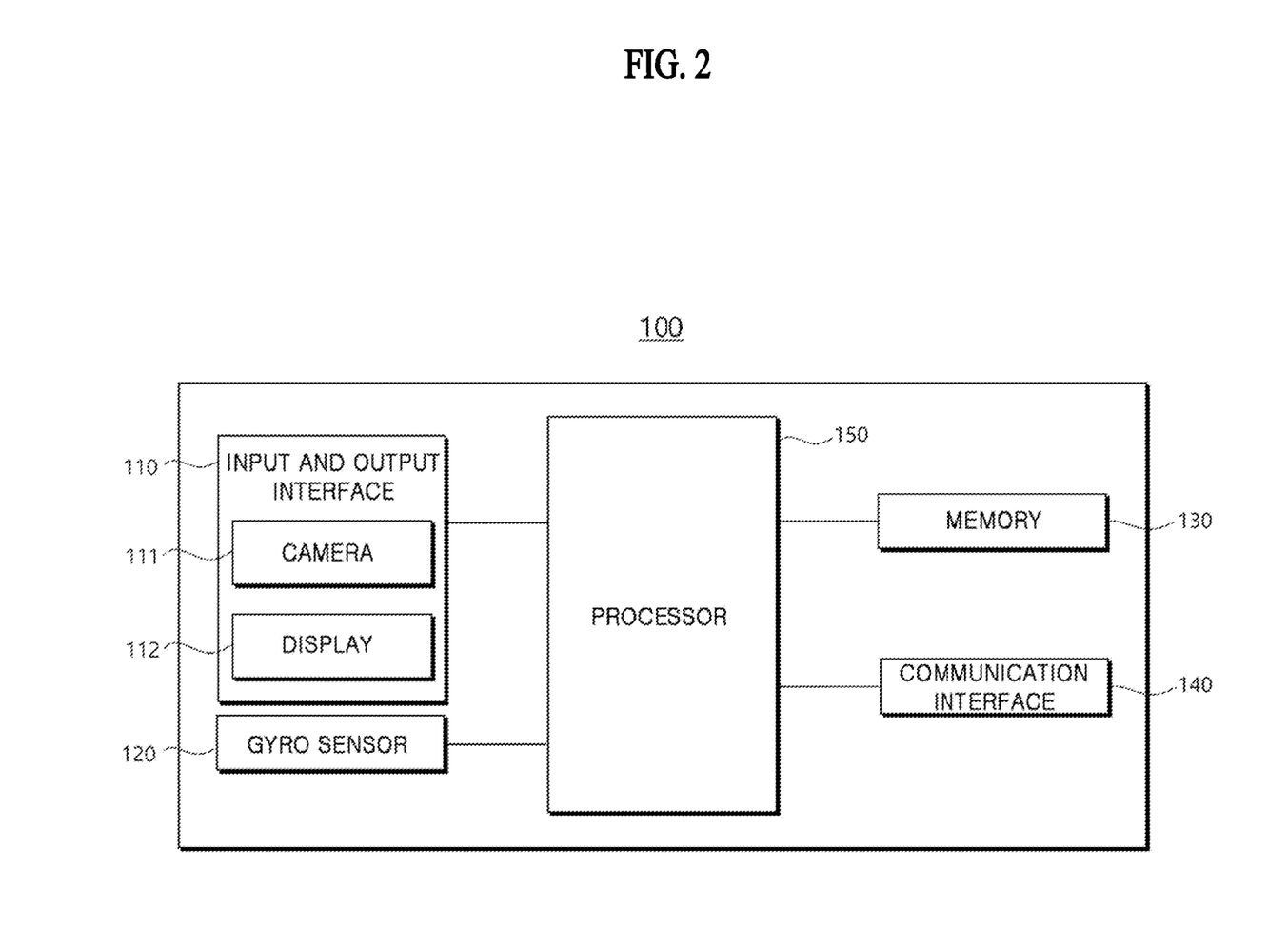
FIG. 2 is a block diagram illustrating a configuration of a terminal according to an embodiment of the present invention.

FIG. 2 is a block diagram illustrating a configuration of a terminal according to an embodiment of the present invention.

Referring to FIG. 2, a first terminal 100 may include an input and output interface 110, a gyro sensor 120, a memory 130, and a communication interface 140. Referring to FIG. 1, a second terminal 200 may be implemented in a similar or identical configuration to the first terminal 100.

The input and output interface 110 may receive an external signal. The input and output interface 110 may receive a signal from a user of the first terminal 100. Further, the input and output interface 110 may receive a signal from an external device. The input and output interface 110 may include a camera 111 and a display 112. Further, the input and output interface 110 may include a microphone, a keyboard, a mouse, a track ball, a touch screen, a button, a switch, a sensor, a network interface, another input device, or the like. The input and output interface 110 may receive an external sound (e.g., voice) through a microphone included in the input and output interface 110.

Further, the input and output interface 110 may obtain an image or video captured by the camera 111 included in the input and output interface 110 or detect a gesture from a user of the first terminal 100. In some embodiments, the input and output interface 110 may obtain a video (or image) captured by the first terminal 100. The video captured by the first terminal 100 may include a video of the user of the first terminal 100. The video received from the first terminal 100 is not limited to the video of the user of the first terminal 100 and may include various videos captured by the first terminal 100.

The input and output interface 110 may include the display 112. For example, the display 112 may include a flat display device, such as a liquid-crystal display (LCD), an organic light-emitting diode (OLED) display, a plasma display panel (PDP), or the like. The display 112 may include a curved display or a flexible display. The display 112 may include a touch screen. When the display 112 includes the touch screen, the display 112 may receive a touch input from the user of the first terminal 100.

The display 112 may display data. Alternatively, the display 112 may display a result of an operation performed by a processor 150. Alternatively, the display 112 may display data stored in the memory 130. The display 112 may display data received through the input and output interface 110 or data received through the communication interface 140.

The display 112 may display a screen. The display 112 may display a user interface. The display 112 may display another screen in response to the input from the user.

The gyro sensor 120 may include a sensor for detecting movement of an object using a gyroscope, an inertial sensor, or an acceleration sensor. The gyroscope includes a mechanical gyroscope, a ring laser gyroscope, a fiber optic gyroscope, or the like. The gyro sensor 120 may detect movement of the first terminal 100 and generate a signal for controlling the first terminal 100.

In some embodiments, when the gyro sensor 120 detects an angular velocity that changes faster than a threshold angular velocity, the gyro sensor 120 may generate a specific event. More specifically, when the gyro sensor 120 detects an angular velocity that changes faster than the threshold angular velocity while facing in an arbitrary direction, the gyro sensor 120 may generate a specific event. In another embodiment, the processor 150 may generate (or detect) a specific event when the first terminal 100 is inclined at an angle exceeding a threshold angle using the gyro sensor 120. In still another embodiment, the processor 150 may generate (or detect) a specific event when the first terminal 100 is inclined at an angle exceeding the threshold angle and at an angular velocity faster than the threshold angular velocity using the gyro sensor 120.

The memory 130 may store data. The memory 130 may store sound data, image data, or profile information of the user, which are received from the input and output interface 110. In addition, the memory 130 may store a result of an operation performed by the processor 150. For example, the memory 130 may store a sound encoded by the processor 150. The memory 130 may store data to be output to outside through the communication interface 140 or may store data received from outside through the communication interface 140.

The memory 130 may store software or programs. For example, the memory 130 may store applications, programs such as an application programming interface (API) and the like, and various types of data. The memory 130 may store instructions executable by the processor 150.

The memory 130 may include at least one of a volatile memory and a non-volatile memory. The memory 130 may include, for example, at least one of a flash memory, a read only memory (ROM), a random access memory (RAM), an electrically erasable ROM (EEROM), an erasable programmable ROM (EPROM), an electrically erasable programmable ROM (EEPROM), a hard disk drive (HDD), and a register. The memory 130 may include, for example, a file system, a database, an embedded database, or the like.

The communication interface 140 may output data to the outside of the first terminal 100 or may receive external data. The communication interface 140 may output data to a server 300 or an external device. The communication interface 140 may receive data from the server 300 and an external device. The communication interface 140 may output a result of an operation performed by a processor 150 to an external device.

In some embodiments, when an application that provides a video call session is executed by the processor 150 of the first terminal 100, the communication interface 140 may receive a video or a sound from the second terminal 200.

Further, when the application that provides the video call session is executed by the processor 150 of the first terminal 100, the communication interface 140 may transmit a video or sound, such as a video captured by the user of the first terminal 100 or a voice of the user of the first terminal 100, to the second terminal 200.

The communication interface 140 may include, for example, remote network interfaces, such as a 3G module, an LTE module, an LTE-A module, a Wi-Fi module, a WiGig module, an ultra-wide band (UWB) module, a LAN card, or the like. Further, the communication interface 140 may include short-range network interfaces, such as an MST module, a Bluetooth module, an NFC module, an RFID module, a ZigBee module, a Z-Wave module, an IR module, or the like. Further, the communication interface 140 may include other network interfaces.

The processor 150 or each component included in the processor 150 may be implemented in the form of software or hardware. For example, the software may be implemented as program execution instructions, such as machine codes, firmware codes, embedded codes, applications, and the like. The hardware may include electrical and electronic circuits, processors, computers, pressure sensors, inertial sensors, microelectromechanical systems (MEMSs), passive elements, or combinations thereof.

The processor 150 may control an operation of a terminal (e.g., the first terminal 100). The processor 150 may be connected to each component included in the first terminal 100 and may control an operation of each of the components included in the first terminal 100. The processor 150 may control the operation of the first terminal 100 in response to the signal received by the input and output interface 110.

In some embodiments, when the application that provides the video call session is executed by the processor 150 of the first terminal 100, the processor 150 may detect whether a specific event occurs during a video call.

In some embodiments, the processor 150 may receive a specific event from the gyro sensor 120. In another embodiment, the processor 150 may detect a specific event in a first video received by the camera 111. For example, when a face of a first user disappears within a reference time from the first video, the processor 150 may detect such a change as a specific event.

When the specific event is received, the processor 150 may recognize a video (e.g., the first video and/or the first sound) of the user of the first terminal 100 received through the input and output interface 110. The processor 150 may inspect the video (e.g., the first video and/or the first sound) of the user of the first terminal 100.

In some embodiments, the processor 150 may inspect a video of the user of the first terminal 100, which is received after the specific event occurs, using a prepared learning model. In another embodiment, the processor 150 may randomly select and inspect one of frames constituting the video of the user of the first terminal 100 using the prepared learning model.

For example, in a state in which the specific event is not detected, the processor 150 may monitor whether an inappropriate element is included in the video of the user by inspecting the video of the user at predetermined time intervals (e.g., every two seconds). For example, the processor 150 may periodically or consecutively check whether the specific event is detected using the gyro sensor 120 or the camera 111. When the specific event is detected, the processor 150 may immediately inspect whether the inappropriate element is included in the video (or sound) of the user even when a predetermined monitoring time period does not come.

In other words, according to one embodiment the processor 150 may monitor whether the inappropriate element is included in the video (e.g., the first image and/or the first sound) of the user every first period and check whether the specific event is detected in the terminal 100 every second period. For example, the second period may be shorter than the first period. For example, the checking every second period may include a case of consecutively checking. The processor 150 may check whether the specific event is detected every second period and, when the specific event is detected, monitor whether the inappropriate element is included in the video of the user even before reaching the first period. In this way, the processor 150 may monitor the video of the user every first period and, even in a case in which the inappropriate element is included in the remaining unmonitored part of the video of the user, monitor the video of the user in an indirect manner by detecting the specific event so as not to exclude the above case.

Figure 3:
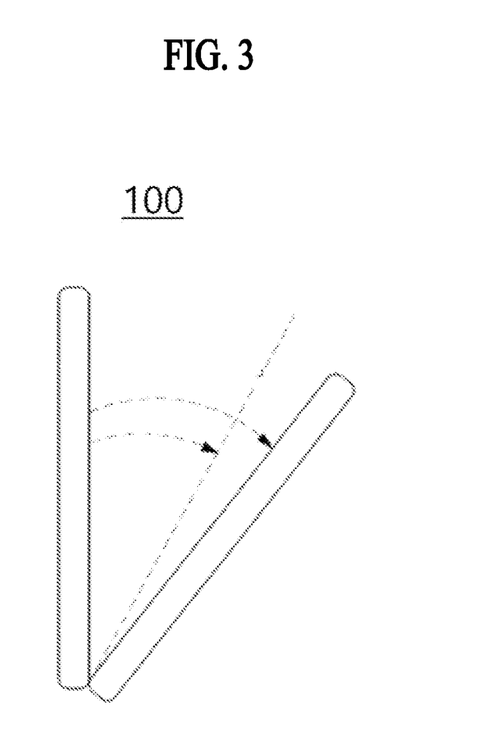
FIG. 3 is a diagram illustrating inclination of a terminal according to an embodiment of the present invention.

FIG. 3 is a diagram illustrating inclination of a terminal according to an embodiment of the present invention.

Referring to FIGS. 2 and 3, the first terminal 100 may be inclined in an arbitrary direction during a video call session. In some embodiments, the arbitrary direction may refer to a direction in which the display 112 of the first terminal 100 is inclined toward the ground.

In some embodiments, when the first terminal 100 is inclined in an arbitrary direction at an angular velocity exceeding a threshold angular velocity, the gyro sensor 120 of the first terminal 100 may detect a specific event.

In some embodiments, when the first terminal 100 is inclined in an arbitrary direction at an angle exceeding a threshold angle, processor 150 may generate a specific event in response that the gyro sensor 120 of the first terminal 100 detect the inclining of the first terminal 100.

Figure 4:
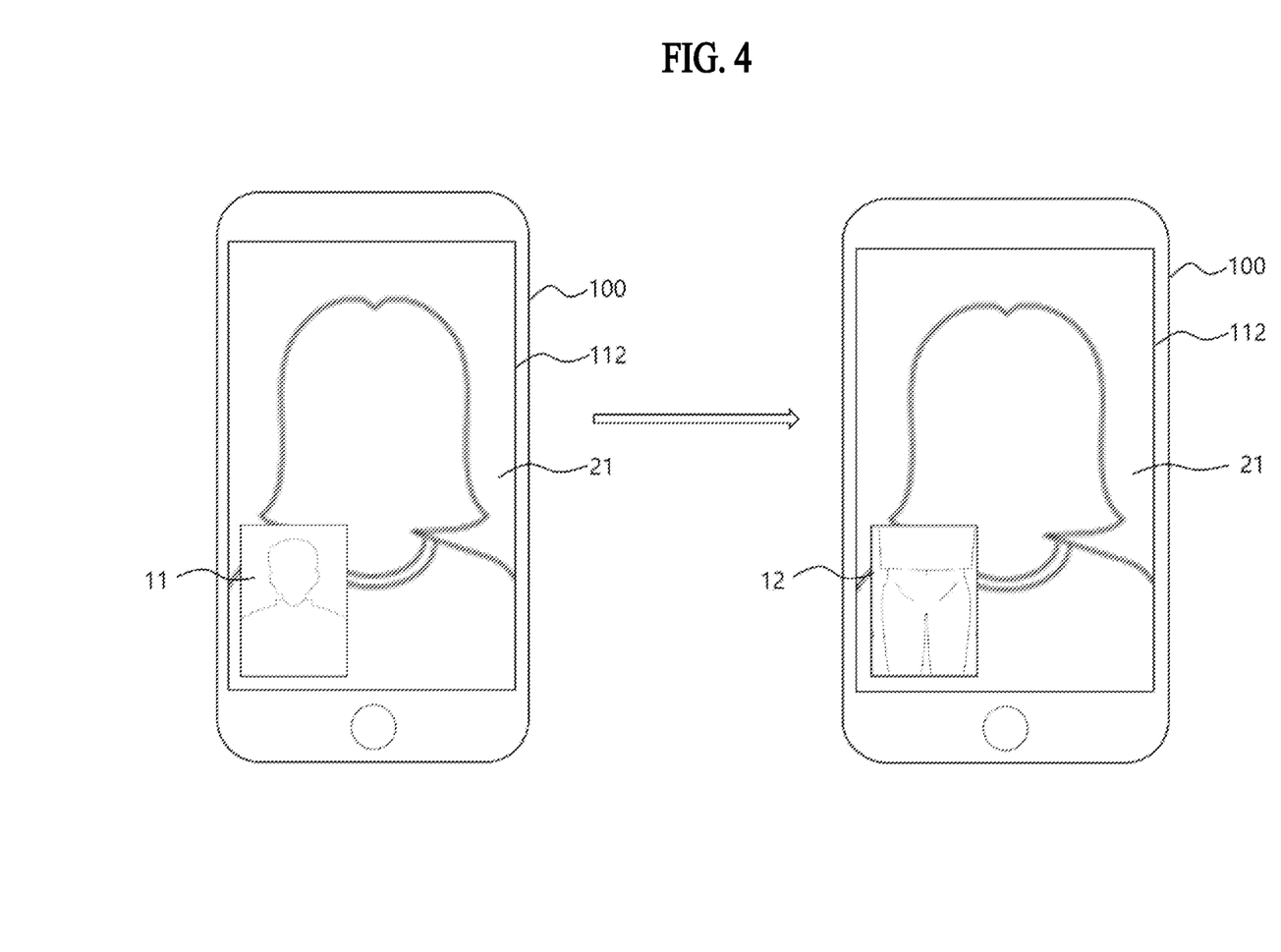
FIG. 4 is a diagram illustrating a change of a display of a terminal during a video call session according to an embodiment of the present invention.

FIG. 4 is a diagram illustrating a change of a display of a terminal during a video call session according to an embodiment of the present invention.

A first terminal 100 may establish a video call session with a second terminal 200 using an application that provides a video call session. When the video call session is established between the first terminal 100 and the second terminal 200, the first terminal 100 may make a video call with the second terminal 200.

When the video call session is established, a video 11 of a first user, which is acquired through a camera 111, and a video 21 of a second user, which is received through a communication interface 140, may be displayed on a display 112 of the first terminal 100. For example, the video 11 of the first user may be a video of an upper body including a face of the first user. In addition, the video 21 of the second user may be a video of an upper body including a face of the second user.

In some embodiments, as described with reference to FIG. 3, the first terminal 100 may be inclined in an arbitrary direction during the video call session. In some embodiments, the arbitrary direction may refer to a direction in which the display 112 of the first terminal 100 is inclined toward the ground.

In some embodiments, when the first terminal 100 is inclined in an arbitrary direction at an angular velocity exceeding a threshold angular velocity and/or is inclined in an arbitrary direction at an angle exceeding a threshold angle, a gyro sensor 120 of the first terminal 100 may detect such inclination.

When the first terminal 100 is inclined in an arbitrary direction, a video 12 corresponding to a lower body of the first user may be input to the camera 111 instead of the video 11 corresponding to the upper body including the face of the first user. Therefore, the video 12 corresponding to the lower body of the first user may be displayed on the display 112.

Figure 5:
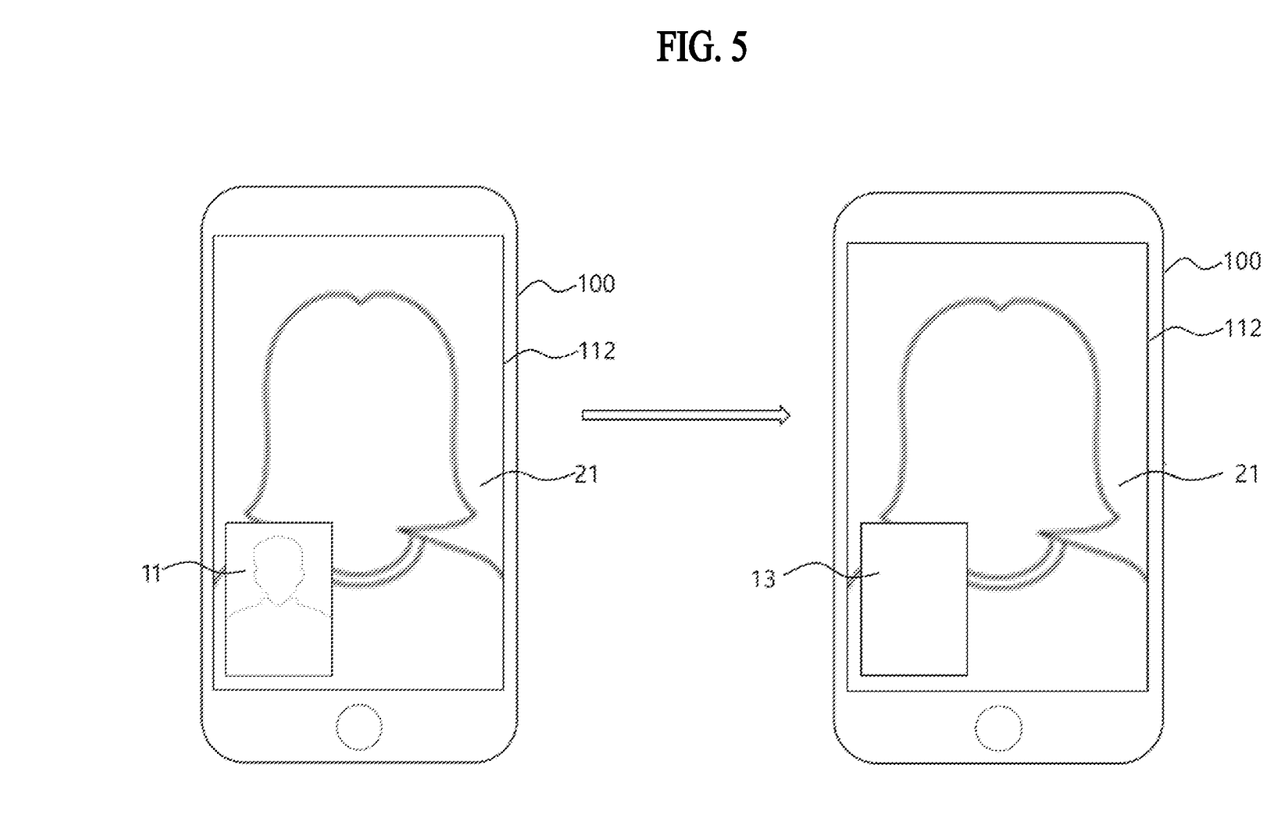
FIG. 5 is a diagram illustrating a change of a display of a terminal during a video call session according to another embodiment of the present invention.

FIG. 5 is a diagram illustrating a change of a display of a terminal during a video call session according to another embodiment of the present invention.

In some embodiments, when the first terminal 100 is inclined in an arbitrary direction at an angular velocity exceeding a threshold angular velocity or is inclined in an arbitrary direction at an angle exceeding a threshold angle, the gyro sensor 120 of the first terminal 100 may detect such inclination.

When the first terminal 100 is inclined in an arbitrary direction, the video 11 corresponding to the upper body of the first user may not be displayed on the display 112, and a surrounding video 13 of the first user may be displayed. In some embodiments, the surrounding video 13 of the first user may also include the video 12 corresponding to the lower body of the first user.

In another embodiment, when the video 11 corresponding to the upper body of the first user is not received by the camera 111 within a reference time, the processor 150 of the first terminal 100 may determine that a specific event has occurred. In this way, the processor 150 of the first terminal 100 may determine whether a specific event occurs on the basis of whether a predetermined type of object (e.g., face, upper body, etc.) is included in the first image acquired through the camera 111 and/or of time information with or without the predetermined type of object.

As described with reference to FIGS. 4 and 5, when the first terminal 100 is inclined in the arbitrary direction at the angular velocity exceeding the threshold angular velocity and/or is inclined in the arbitrary direction at the angle exceeding the threshold angle, the gyro sensor 120 of the first terminal 100 may detect the specific event. Alternatively, when the video 11 corresponding to the predetermined type of object (e.g., the upper body of the first user) is not received by the camera 111 within the reference time, the processor 150 of the first terminal 100 may determine that a specific event has occurred.

When the specific event occurs, the processor 150 may determine whether an inappropriate element is included in the video received from the camera 111. In some embodiments, the video including the inappropriate element may include the video 12 corresponding to the lower body of the first user as described with reference to FIG. 4.

In an embodiment, the processor 150 may be provided with a classification model which is trained using classification information on whether an inappropriate element is included in an image. The processor 150 may predict whether a video, which is received by the camera 111 after the specific event occurs, includes the inappropriate element using the classification model. For example, the classification model may include a learning model trained with a correlation between factors related to the detection of the specific event (e.g., the angular velocity and/or angle related to the inclination of the first terminal and whether the predetermined type of object is included in the first video) and the inappropriate element.

In another embodiment, when the specific event occurs, the processor 150 may determine whether an inappropriate element is included in a first sound (e.g., a video of the first user). The sound (e.g., voice) including the inappropriate element may correspond to at least one of abusive, intimidatory, hateful, anti-social, misanthropic, sexual, criminal, and offensive statements.

When the specific event occurs and the processor 150 determines that the video or the sound includes the inappropriate element, the processor 150 may stop transmitting at least one of the video and sound of the first user.

Figure 6:
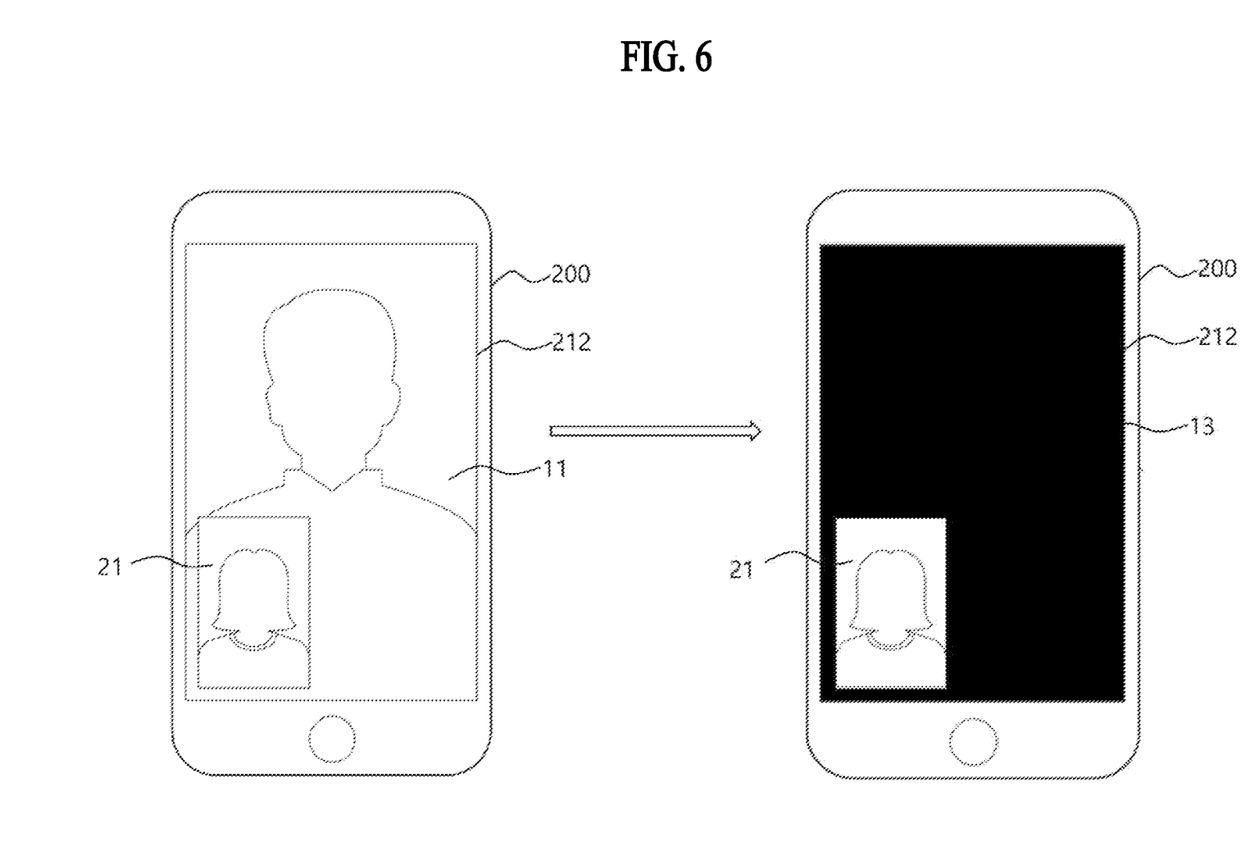
FIG. 6 is a diagram illustrating a change of a display of a terminal during a video call session according to still another embodiment of the present invention.

FIG. 6 is a diagram illustrating a change of a display of a terminal during a video call session according to still another embodiment of the present invention.

The second terminal 200 may establish a video call session with the first terminal 100 using an application that provides a video call service. When the video call session is established between the first terminal 100 and the second terminal 200, the second terminal 200 may make a video call with the first terminal 100.

When the video call session is established, a video 21 of the second user may be displayed on a display 212 of the second terminal 200 and a video 11 of the first user received from the first terminal 100 may be displayed. For example, the video 11 of the first user may be a video of an upper body including a face of the first user. In addition, the video 21 of the second user may be a video of an upper body including a face of the second user.

Referring to FIGS. 4 and 5, when a specific event is detected from the first terminal 100, the first terminal 100 may stop transmitting the video and/or sound to the second terminal 200, and the second terminal 200 may stop receiving the video and/or the sound from the first terminal 100. When the reception of the video and the sound from the first terminal 100 stops, the display 212 of the second terminal 200 may display an alternative video 13.

In some embodiments the alternative video 13 may be a video processed in a single color. Alternatively, the alternative video 13 may be a video modulated using a mosaic effect, background insertion, or blur processing on the video received from the first terminal 100.

Figure 7:
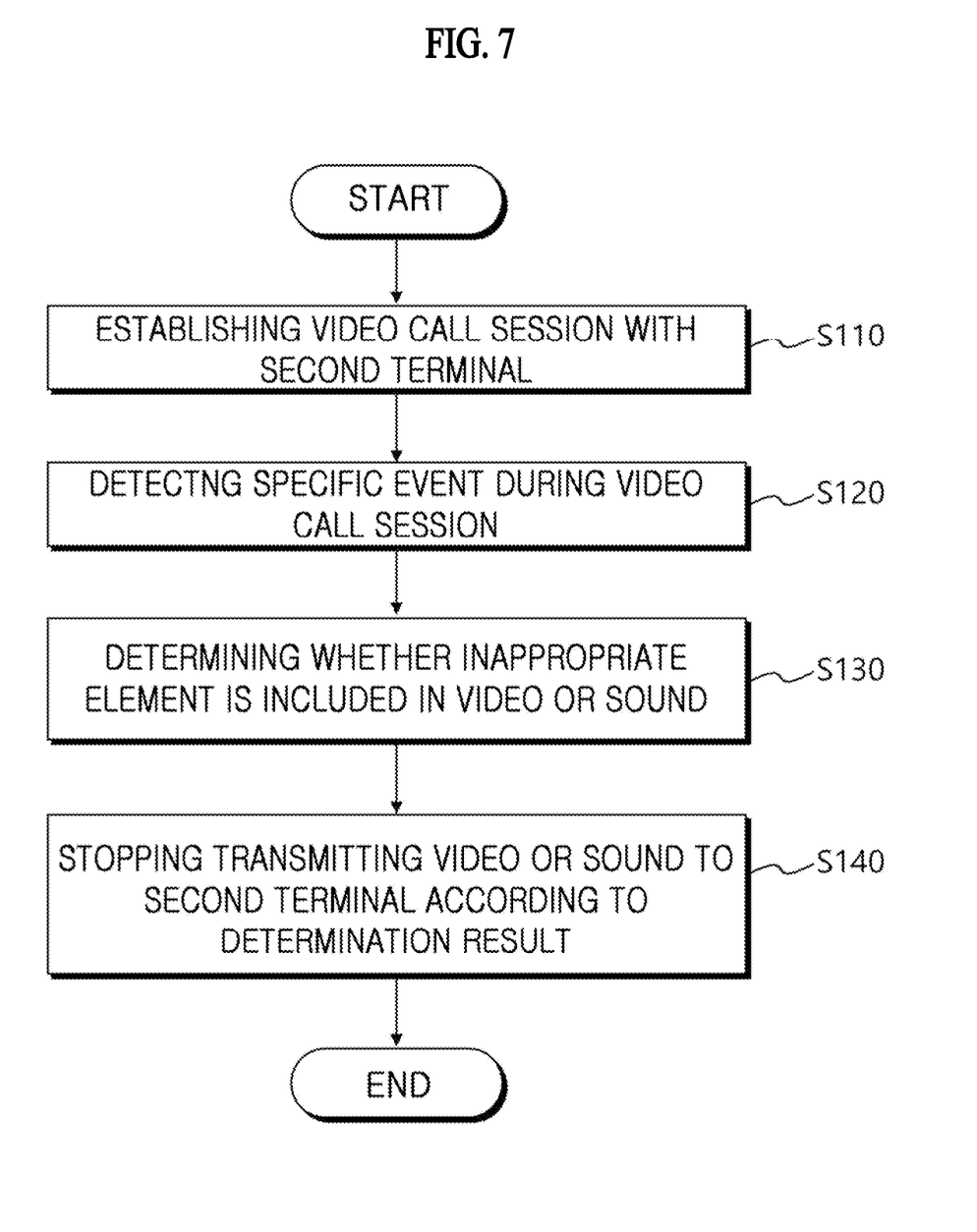
FIG. 7 is a flowchart illustrating a method of operating a terminal according to an embodiment of the present invention.

FIG. 7 is a flowchart illustrating a method of operating a terminal according to an embodiment of the present invention.

In operation S110, a first terminal 100 may establish a video call session with a second terminal. The first terminal 100 may establish the video call session with the second terminal 200 using an application that provides a video call session. When the video call session is established between the first terminal 100 and the second terminal 200, the first terminal 100 may make a video call with the second terminal 200.

In operation S120, the first terminal 100 may detect a specific event during the video call session. When the first terminal 100 is inclined in an arbitrary direction at an angular velocity exceeding a threshold angular velocity or is inclined in an arbitrary direction at an angle exceeding a threshold angle, a gyro sensor 120 may detect such a change as a specific event.

Alternatively, when a video 11 corresponding to a specific type of object (e.g., an upper body of a first user) is not received by a camera 111 within a reference time, a processor 150 of the first terminal 100 may determine that a specific event has occurred.

In operation S130, the processor 150 of the first terminal 100 may determine whether an inappropriate element is included in a video or sound received in real time by the camera 111 after the specific event occurs.

In some embodiments, the processor 150 may be provided with a classification model (e.g., machine learning model) which is trained using classification information on whether the inappropriate element is included in a specific image (e.g., video and/or sound). The processor 150 may predict whether the video, which is acquired through the camera 111 after the specific event occurs, includes the inappropriate element using the classification model trained using the classification information related to whether the inappropriate element is included in the image.

The processor 150 of the first terminal 100 may use a learning model according to at least one of techniques of a deep neural network (DNN), a convolutional neural network (CNN), a recurrent neural network (RNN), region-based convolutional neural networks (R-CNN), a restricted Boltzmann machine (RBM), a deep belief network (DBN), and deep Q-networks in order to predict whether the video, which is received by the camera 111 after the specific event occurs, includes the inappropriate element.

According to another embodiment, the classification model may include a classification model learned with a correlation between sensed values (e.g., the angular velocity and/or angle related to the inclination of the first terminal 100, whether the specific type of object (e.g., the upper body of the first user) is included in the first video, etc.) related to the detection of the specific event and whether the inappropriate element is included in the image.

For example, the processor 150 may set a criterion for detecting the specific event or determine whether the inappropriate element is included in the video (and/or sound) obtained through the camera 111 in the first terminal 100 by using the classification model.

As another example, when the specific event is detected, the processor 150 may determine a time point to determine whether the inappropriate element is included in the video (and/or sound) acquired through the camera 111 in the first terminal 100 using the classification model and may determine whether the inappropriate element is included in the video (and/or sound) corresponding to the time point. For example, the processor 150 may determine that the inappropriate element is likely to be included in a video (and/or sound) acquired within a predetermined period of time (e.g., 0.5 seconds) after the specific event occurs on the basis of the classification model and, accordingly, the processor 150 may check at a shorter period (or consecutively) whether the inappropriate element is included in a video (and/or sound) generated during a predetermined period of time after the occurrence of the specific event.

In operation S140, the processor 150 of the first terminal 100 may stop transmitting the video or sound which is received by the camera 111 after the specific event occurs to the second terminal 200 according to a result of the determination.

For example, when it is determined that the inappropriate element is included in the video or sound received by the camera 111 after the specific event occurs, the processor 150 may stop transmitting the video or the sound to the second terminal 200. Alternatively, when it is determined that the inappropriate element is not included in the video or sound received by the camera 111 after the specific event occurs, the processor 150 may maintain the transmitting of the video or the sound to the second terminal 200.

That is, the processor 150 of the first terminal 100 may not determine whether the inappropriate element is included in the video or sound received by the camera 111 before the specific event occurs and may determine whether the inappropriate element is included in the video or sound received by the camera 111 after the specific event occurs. Further, according to a result of the determination, the processor 150 may determine whether to transmit the video or sound received by the camera 111 after the specific event occurs.

Figure 8:
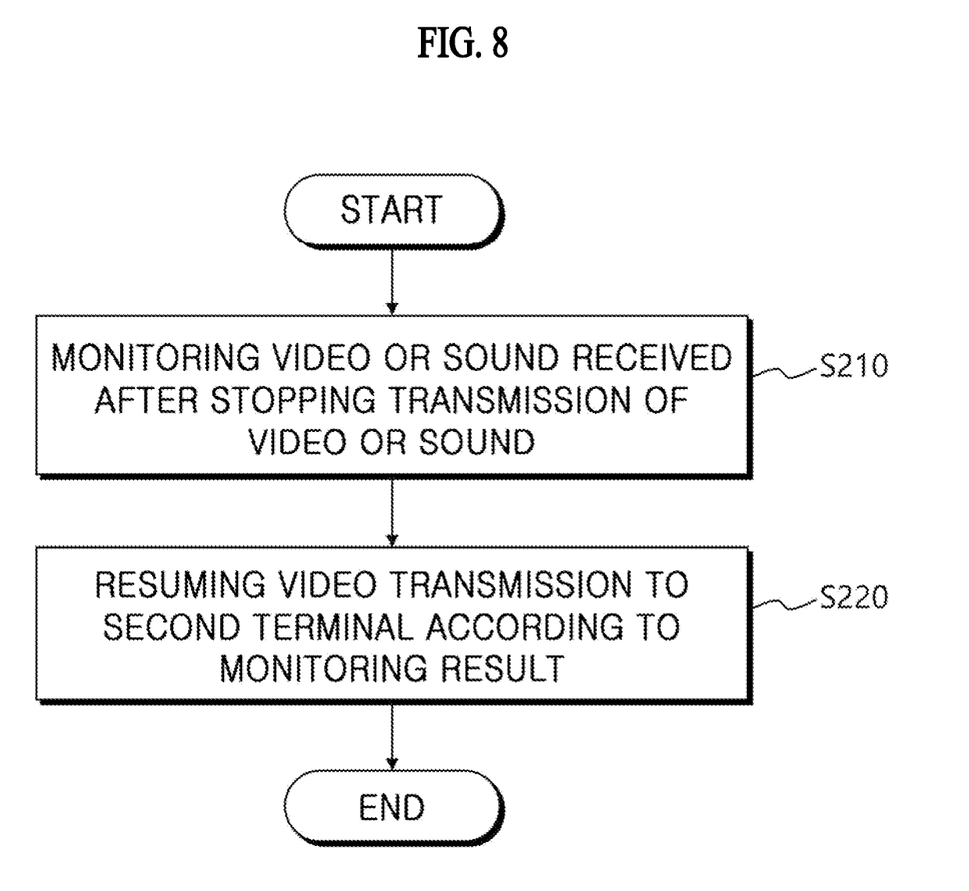
FIG. 8 is a flowchart illustrating a method of operating a terminal according to another embodiment of the present invention.

FIG. 8 is a flowchart illustrating a method of operating a terminal according to another embodiment of the present invention.

In operation S210, a processor 150 of a first terminal 100 may monitor a video or sound received by a camera 111 after the transmission of the video or sound stops.

In some embodiments, the processor 150 may monitor whether the inappropriate element is included in the video or sound, which is received by the camera 111 after the transmission of the video or sound stops, at a predetermined time interval.

Alternatively, after the transmission of the video or the sound stops, when a new specific event occurs, the processor 150 may check whether the inappropriate element is included in the video or sound received by the camera 111.

In operation S220, the processor 150 of the first terminal 100 may resume the video transmission to the second terminal 200 according to a result of the monitoring.

In some embodiments, after the transmission of the video or the sound stops, when the processor 150 determines that the inappropriate element is not included in the video or sound received by the camera 111, the processor 150 may resume the video transmission to the second terminal 200.

On the other hand, after the transmission of the video or the sound stops, when the processor 150 determines that the inappropriate element is included in the video or sound received by the camera 111, the processor 150 may not resume the video transmission to the second terminal 200. Further, the processor 150 may stop the video call session with the second terminal 200.

As described with reference to FIGS. 1 to 8, the terminals according to the embodiments of the present invention may prevent users from being exposed to inappropriate videos or sounds during video call sessions.

The terminals according to the embodiments of the present invention may prevent sexual shame or displeasure that users may feel due to videos from counterparts during video call sessions.

The terminals according to the embodiments of the present invention may induce users to make wholesome video calls.

The embodiments described above may also be realized in the form of a recording medium including instructions executable by a computer, such as a program module executed by a computer. Computer-readable media may be any available media which may be accessed by the computer and include any one of volatile and non-volatile media and separable and non-separable media.

Further, the computer-readable media may also include computer storage media or communication media. The computer storage media may include any one of volatile and non-volatile media and separable and non-separable media, which are implemented using any method or technology for the storage of information such as computer-readable instructions, data structures, program modules, or other pieces of data. The communication media may typically include computer-readable instructions, data structures, program modules, other pieces of data in a modulated data signal such as a carrier wave, or other output mechanisms and may include arbitrary information delivery media.

According to the present invention, a terminal, which is capable of preventing a user who is making a video call with a counterpart from being exposed to a video including an inappropriate element (e.g., an obscene video) provided from the counterpart, and an operating method thereof can be provided.

Further, according to the present invention, a terminal, which is capable of preventing sexual shame or displeasure that a user who is making a video call with a counterpart can feel due to a video provided from the counterpart, and an operating method thereof can be provided.

Further, according to the present invention, a terminal, which is capable of inducing users to make a sound video call, an operating method thereof can be provided.

The embodiments of the present invention have been described above with reference to the accompanying drawings. However, it should be understood by those skilled in the art that various modifications can be made without departing from the scope of the present invention and without changing essential features thereof. Therefore, the above-described embodiments should be considered in a descriptive sense only and not for purposes of limitation.

What is claimed is:

1. An application stored in a computer-readable storage medium for performing a method of providing a video call service, the method comprising:
    establishing a video call session between a first terminal and a second terminal;
    transmitting at least one of a first video and a first sound obtained from the first terminal corresponding to a first user to the second terminal;
    receiving, by the first terminal, at least one of a second video and a second sound obtained from the second terminal corresponding to a second user;
    detecting, by a sensor of the first terminal, a specific event during the video call session;
    responsive to the detecting of the specific event by the first terminal, inspecting whether an inappropriate element is included in the first video or the first sound; and
    stopping, by the first terminal, the transmitting of the first video or the first sound of the first user according to a result of the inspecting.

2. The application of claim 1, wherein the specific event comprises an event in which the first terminal is inclined in an arbitrary direction at an angular velocity exceeding a threshold angular velocity.

3. The application of claim 1, wherein the inspecting of whether the inappropriate element is included in the first video or the first sound comprises:
    inspecting whether the inappropriate element is included in the first video or the first sound, which is obtained after the specific event is detected, using a classification model trained with a correlation between the video or sound and the inappropriate element.

4. The application of claim 1, wherein detecting the specific event comprises detecting an event in which a face of the first user disappears at a velocity exceeding a threshold velocity from the first video obtained by the first terminal.

5. The application of claim 1, further comprising, when the first terminal stops the transmitting of the first video or the first sound, displaying an alternative video instead of the first video in the second terminal.

6. The application of claim 1, further comprising:
    monitoring, by the first terminal, whether an inappropriate element is included in a video or sound, which is obtained by the first terminal after the transmitting of the first video or the first sound stops, at a predetermined time interval; and
    when the inappropriate element is not included in the video or sound as a result of the monitoring, resuming the transmitting of the video or sound obtained by the first terminal.

7. The application of claim 1, wherein the specific event is a first specific event, and
    the method further comprises:

detecting, by the first terminal, a second specific event after the first terminal stops the transmitting of the first video or the first sound;

when the second specific event is detected, inspecting whether an inappropriate element is included in a video or sound, which is obtained by the first terminal in response to the detecting of the second specific event; and when the inappropriate element is not included in the video or sound, which is obtained by the first terminal after the second specific event is detected, resuming, by the first terminal, the transmitting of the video or sound, which is generated by the first terminal.

8. The application of claim 1, wherein the specific event comprises an event in which the first terminal is inclined in an arbitrary direction at an angle exceeding a threshold angle.

9. A non-transitory computer-readable recording medium on which a program for the application according to any one of claims 1 to 8 is recorded.

10. A terminal comprising:
an input and output interface configured to receive at least one of a first video and a first sound which are related to a first user;
a communication interface configured to transmit the at least one of the first video and the first sound to a terminal of a counterpart and receive a second video or second sound, which is obtained by the terminal of the counterpart, through a video call session;
a display configured to display the first video and the second video;
a sensor to detect movement of the terminal; and
a processor configured to:
detect, using the sensor, a specific event during the video call session,
responsive to the detecting of the specific event, inspect whether an inappropriate element is included in the first video or the first sound, and
stop transmitting the first video or the first sound according to a result of the inspection.

11. The terminal of claim 10, wherein the processor detects the specific event in at least one of a case in which the terminal is inclined in an arbitrary direction at an angular velocity exceeding a threshold angular velocity and a case in which the terminal is inclined in an arbitrary direction at an angle exceeding a threshold angle.

12. The terminal of claim 11, wherein the processor inspects whether the inappropriate element is included in the first video or the first sound, which is received after the specific event is detected, using a classification model trained using a correlation between the video or sound and the inappropriate element.

13. The terminal of claim 10, wherein the processor monitors whether the inappropriate element is included in the first video or sound, which is received after the transmitting of the first voice or the first sound stops, at a predetermined time interval, and resumes the transmitting of the video or sound when the inappropriate element is not found as a result of the monitoring.

14. The terminal of claim 10, wherein the specific event is a first specific event, and the processor detects a second specific event after the transmitting of the first video or the first sound stops, when the second specific event is detected, inspects whether the inappropriate element is included in the video and sound which is received after the second specific event is detected, and when the inappropriate element is not included, resumes the transmitting of the video or sound.

15. The terminal of claim 10, wherein, before the specific event is detected, the processor inspects whether the inappropriate element is included in the first video or the first sound every first period, and when the specific event is detected, the processor inspects whether the inappropriate element is included in the first video or the first sound in response to the detection of the specific event.

16. The terminal of claim 15, wherein, when the specific event is detected, the processor inspects whether the inappropriate element is included in the first video or the first sound every second period for a specific period of time.

17. The application of claim 1, wherein the inspecting of whether the inappropriate element is included includes, before the event is detected, inspecting whether the inappropriate element is included in the first video or the first sound every first period, and when the specific event is detected, inspecting whether the inappropriate element is included in the first video or the first sound every second period.

18. The application of claim 1, wherein the sensor is a gyro sensor.

19. The application of claim 1, wherein detecting the specific event comprises detecting a movement of the first terminal.

* * * * *